United States Patent
Song et al.

(10) Patent No.: US 10,825,445 B2
(45) Date of Patent: Nov. 3, 2020

(54) METHOD AND APPARATUS FOR TRAINING ACOUSTIC MODEL

(71) Applicant: SAMSUNG ELECTRONICS CO., LTD., Suwon-si (KR)

(72) Inventors: Inchul Song, Suwon-si (KR); Sang Hyun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 15/819,924

(22) Filed: Nov. 21, 2017

(65) Prior Publication Data

US 2018/0277143 A1 Sep. 27, 2018

(30) Foreign Application Priority Data

Mar. 23, 2017 (KR) .................. 10-2017-0036644
Aug. 25, 2017 (KR) .................. 10-2017-0108060

(51) Int. Cl.
*G10L 15/06* (2013.01)
*G10L 15/16* (2006.01)
*G10L 25/30* (2013.01)
*G10L 15/187* (2013.01)

(52) U.S. Cl.
CPC .......... *G10L 15/063* (2013.01); *G10L 15/16* (2013.01); *G10L 25/30* (2013.01); *G10L 15/187* (2013.01)

(58) Field of Classification Search
CPC .............................. G10L 15/063; G10L 25/30
USPC ........................................................ 704/243
See application file for complete search history.

(56) References Cited

U.S. PATENT DOCUMENTS

| 6,263,308 B1* | 7/2001 | Heckerman ........... G10L 15/063 704/231 |
| 2015/0127337 A1 | 5/2015 | Heigold et al. |
| 2015/0255069 A1* | 9/2015 | Adams ................. G10L 15/08 704/236 |
| 2015/0310329 A1 | 10/2015 | Dognin et al. |
| 2017/0011738 A1* | 1/2017 | Senior .................. G10L 15/063 |
| 2017/0025119 A1* | 1/2017 | Song .................... G10L 15/04 |

FOREIGN PATENT DOCUMENTS

| EP | 3 121 810 A1 | 1/2017 |
| JP | 2654917 B2 | 5/1997 |
| JP | 2009-511954 A | 3/2009 |
| JP | 2016-502140 A | 1/2016 |
| KR | 10-0576803 B1 | 5/2006 |

(Continued)

OTHER PUBLICATIONS

Kingsbury, Brian, "Lattice-Based Optimization of Sequence Classification Criteria for Neural-Network Acoustic Modeling", *2009 IEEE International Conference on Acoustics, Speech and Signal Processing*, 2009, (pp. 3761-3764).

(Continued)

*Primary Examiner* — Shaun Roberts
(74) *Attorney, Agent, or Firm* — NSIP Law

(57) ABSTRACT

A training method of an acoustic model includes constructing window-level input speech data based on a speech sequence; inputting the window-level input speech data to an acoustic model; calculating a sequence level-error based on an output of the acoustic model; acquiring window-level errors based on the sequence level-error; and updating the acoustic model based on the window-level errors.

25 Claims, 10 Drawing Sheets

(56) References Cited

FOREIGN PATENT DOCUMENTS

KR        10-0880480 B1      1/2009
KR    10-2017-0011905 A      2/2017

OTHER PUBLICATIONS

Chen, Kai et al., "Training Deep Bidirectional LSTM Acoustic Model for LVCSR by a Context-Sensitive-Chunk BPTT Approach", *IEEE/ACM Transactions on Audio, Speech, and Language Processing*, vol. 24, Issue 7, Jul. 2016 (pp. 1185-1193).
Zeyer, Albert et al., "Towards Online-Recognition with Deep Bidirectional LSTM Acoustic Models", *Proceedings of Interspeech Conference*, Sep. 2016, San Francisco, USA (pp. 3424-3428).
Extended European Search Report dated Jul. 26, 2018 in corresponding European Application No. 18159930.9 (7 pages in English).
Bae, Soohyun, et al. "Environmental Sound Classification using Recurrent Neural Network with Long Short-Term Memory", *The Korean Institute of Communications and Information Sciences*, 2016: 227-228. (3 pages, in Korean with English abstract).
Graves, Alex, et al. "Towards end-to-end speech recognition with recurrent neural networks." *Proceedings of the 31st International Conference on Machine Learning (ICML-14)*. 2014. (9 pages, in English).
Kitazoe, Tetsuro, et al. "Application of a stereovision neural network to continuous speech recognition." *Artificial Life and Robotics* 5.3 (2001): 165-170. (6 pages, in English).
Mesnil, Grégoire, et al. "Investigation of Recurrent-Neural-Network Architectures and Learning Methods for Spoken Language Understanding." *Interspeech*. 2013. (5 pages, in English).
Mohamed, Abdel-rahman, et al. "Deep Bi-Directional Recurrent Networks Over Spectral Windows." *Automatic Speech Recognition and Understanding (ASRU), 2015 IEEE Workshop on*. IEEE, 2015. (6 pages, in English).
Nam, Sang-Yep, et al. "A Real-Time Embedded Speech Recognition System", *Journal of the Institue of Electronics Engineers of Korea*, 2003:74-81. (8 pages, in Korean with English abstract).
Veselý, Karel, et al. "Sequence-Discriminative Training of Deep Neural Networks." *Interspeech*. 2013. (5 pages, in English).
Voigtlaender, Paul, et al. "Sequence-Discriminative Training of Recurrent Neural Networks." *Acoustics, Speech and Signal Processing (ICASSP), 2015 IEEE International Conference on*. IEEE, 2015: 2345-2349 (5 pages, in English).

\* cited by examiner

200

METHOD AND APPARATUS FOR TRAINING ACOUSTIC MODEL

CROSS-REFERENCE TO RELATED APPLICATION(S)

This application claims the benefit under 35 USC § 119(a) of Korean Patent Application No. 10-2017-0036644, filed on Mar. 23, 2017, and Korean Patent Application No. 10-2017-0108060, filed on Aug. 25, 2017, in the Korean Intellectual Property Office, the entire disclosures of which are incorporated herein by reference for all purposes.

BACKGROUND

1. Field

The following description relates to a method and apparatus for training an acoustic model.

2. Description of Related Art

Recently, to attempt to address an issue of classifying an input pattern as a predetermined group, research is being actively conducted on trying to apply an efficient pattern recognition method of humans to an actual computer. The research includes research on an artificial neural network (ANN) obtained by modeling characteristics of human biological neurons. To attempt to address the above issue, the ANN employsan algorithm that attempts to build upon the unique learning abilities of humans. The ANN generates mapping between input patterns and output patterns using the algorithm, which indicates that the ANN has a learning capability. Also, the ANN has a generalization capability to generate a relatively correct output in response to an input pattern that is not used in training based on a training result.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a training method of an acoustic model, includes constructing window-level input speech data based on a speech sequence; inputting the window-level input speech data to an acoustic model; calculating a sequence level-error based on an output of the acoustic model; acquiring window-level errors based on the sequence level-error; and updating the acoustic model based on the window-level errors.

The constructing of the window-level input data may include extracting target data corresponding to a window with a predetermined size and padding data adjacent to the target data from the speech sequence; and constructing the window-level input data based on the target data and the padding data.

The padding data may include at least one of first padding data preceding the target data in the speech sequence or second padding data following the target data in the speech sequence.

The calculating of the sequence-level error may include acquiring a sequence-level acoustic score based on the output of the acoustic model; and calculating the sequence-level error based on the sequence-level acoustic score and a reference sentence associated with the speech sequence.

The acquiring of the sequence-level acoustic score may include acquiring window-level acoustic scores based on the output of the acoustic model; acquiring acoustic scores corresponding to target data by removing acoustic scores corresponding to padding data from the window-level acoustic scores; and connecting the acoustic scores corresponding to the target data and acquiring the sequence-level acoustic score.

The reference sentence may include at least one of a correct sentence associated with the speech sequence or an incorrect sentence associated with the speech sequence.

The acoustic model may be updated so that the window-level errors are reduced.

The updating of the acoustic model may include constructing update data based on the window-level errors and padding data; and updating the acoustic model based on the update data.

The padding data may include either one or both of zeroed data and an error of a window adjacent to a window corresponding to the window-level errors.

A size of the padding data may correspond to a size of padding data included in the window-level input data.

The acoustic model may include a recurrent deep neural network (RDNN), and an unfolded length of the RDNN corresponds to a length of the window-level input data.

A non-transitory computer-readable storage medium may store instructions that, when actuated by a processor, cause the processor to perform the method.

A processor may be actuated to construct the window level input speech data, input the window level input speech data, calculate the sequence-level error, and acquire the window-level error.

In another general aspect, an acoustic model training apparatus includes at least one processor; and a memory comprising an instruction that is readable by the processor, wherein in response to the instruction being executed by the processor, the processor is configured to construct window-level input speech data based on a speech sequence, input the window-level input speech data to an acoustic model, calculate a sequence level-error based on an output of the acoustic model, acquire window-level errors based on the sequence level-error, and update the acoustic model based on the window-level errors.

The processor may be further configured to extract target data corresponding to a window with a predetermined size and padding data adjacent to the target data from the speech sequence, and to construct the window-level input data based on the target data and the padding data.

The padding data comprises at least one of first padding data preceding the target data in the speech sequence or second padding data following the target data in the speech sequence.

The processor may be further configured to acquire a sequence-level acoustic score based on the output of the acoustic model, and to calculate the sequence-level error based on the sequence-level acoustic score and a reference sentence associated with the speech sequence.

The processor may be further configured to acquire window-level acoustic scores based on the output of the acoustic model, to acquire acoustic scores corresponding to target data by removing acoustic scores corresponding to padding data from the window-level acoustic scores, and to acquire the sequence-level acoustic score by connecting the acoustic scores corresponding to the target data.

The reference sentence may include at least one of a correct sentence associated with the speech sequence or an incorrect sentence associated with the speech sequence.

The acoustic model may be updated so that the window-level errors are reduced.

The processor may be further configured to construct update data based on the window-level errors and padding data, and to update the acoustic model based on the update data.

The padding data may include either one or both of zeroed data and an error of a window adjacent to a window corresponding to the window-level errors.

A size of the padding data may correspond to a size of padding data included in the window-level input data.

The acoustic model may include a recurrent deep neural network (RDNN), and an unfolded length of the RDNN may correspond to a length of the window-level input data.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
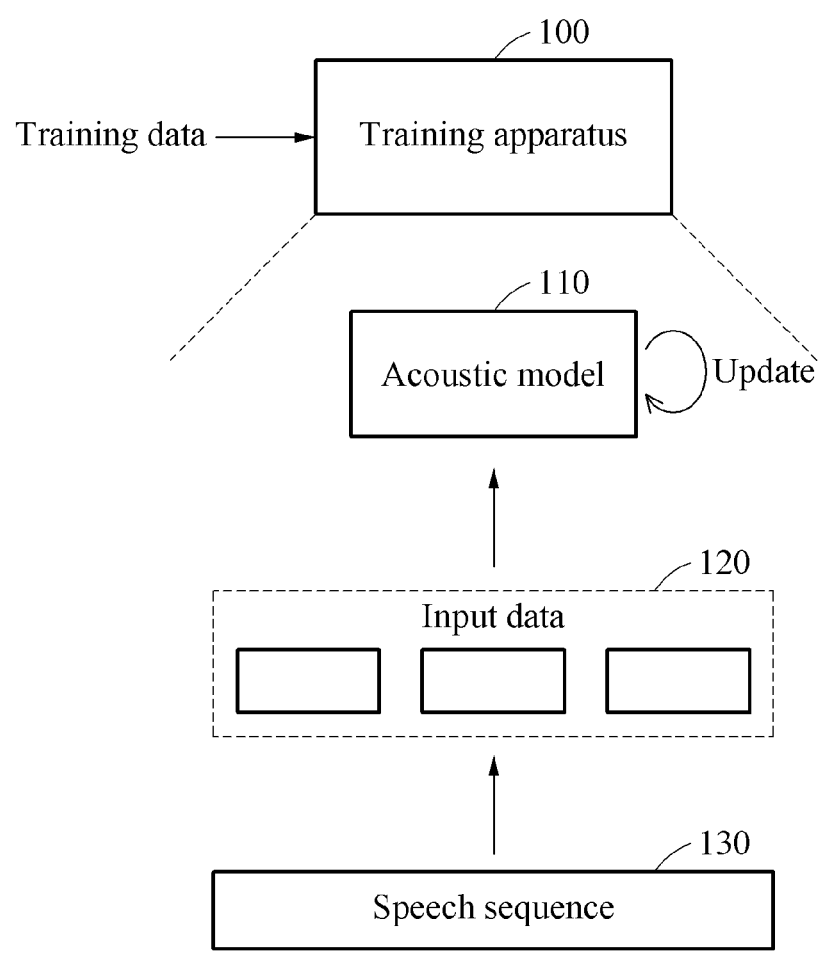
FIG. 1 is a diagram illustrating an example of a training apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed are merely intended for the purpose of describing the examples and the examples may be implemented in various forms. The examples are not meant to be limiting, but it is intended that various modifications, equivalents, and alternatives are also covered within the scope of the claims.

Although terms of "first," "second," etc. are used to explain various components, the components are not limited to such terms. These terms are used only to distinguish one component from another component for clarity. For example, a first component may be referred to as a second component, or similarly, the second component may be referred to as the first component within the scope of the right according to the concept of the present disclosure.

As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings, and like reference numerals in the drawings refer to like elements throughout.

FIG. 1 illustrates an example of a training apparatus 100. Referring to FIG. 1, the training apparatus 100 trains an acoustic model 110. The acoustic model 110 is used for a speech recognition engine, and the speech recognition engine includes an acoustic model and a decoder. The acoustic model provides information about which pronunciation is similar to each frame in an input speech signal. The decoder calculates which word or sentence is similar to an input speech based on the information provided by the acoustic model.

For example, the acoustic model 110 is implemented by a deep neural network (DNN). In this example, the training apparatus 100 trains the acoustic model 110 based on training data. The training data includes a training input and training output. The training input is data that is input to the acoustic model 110, and includes, for example, a speech signal. The training output is data that is mapped to the training input, and includes, for example, a label that to be output from the acoustic model 110 in response to the training input being input to the acoustic model 110. For example, when the training input is a speech signal, the training output is pronunciation probabilities of a sentence that corresponds to the speech signal.

The training apparatus 100 trains the acoustic model 110 to calculate the training output from the training input. In the following description, training of the acoustic model 110 includes, for example, any one or any combination of two or more of training of a parameter of the acoustic model 110, updating of the acoustic model 110 and updating of a parameter of the acoustic model 110.

Depending on examples, the acoustic model 110 is implemented, for example, by a recurrent deep neural network (RDNN) or a bidirectional recurrent deep neural network (BRDNN). The RDNN and BRDNN have structures suitable for recognition of data, for example, speech, that is continuous over time. For example, the RDNN recognizes a current frame based on a previous frame, and the BRDNN recognizes a current frame based on a previous frame and a next frame. The RDNN and the BRDNN are further described below.

The acoustic model is trained based on a frame level or sequence level. Frame-level training is training of the acoustic model so that a correct pronunciation is provided to each frame and that the acoustic model assigns a high score to the correct pronunciation. Sequence-level training is training of the acoustic model so that a high score is assigned to a correct sentence and a low score is assigned to an incorrect sentence after decoding.

In both the frame-level training and the sequence-level training, the acoustic model is trained to assign acoustic scores for each frame. However, the frame-level training and the sequence-level training differ from each other, in one or more embodiments, in that training is performed primarily based on pronunciations for each frame during the frame-level training, and in that training is performed primarily based on an accuracy of a sentence during the sequence-level training. The acoustic model continues to be trained based on sequence levels.

The training apparatus 100 constructs input data 120 by processing a speech sequence 130, calculates a sequence-level error based on the input data 120, and trains the acoustic model 110 such as by, for example back propagation. The speech sequence 130 includes a plurality of frames. The plurality of frames in the speech sequence 130 correspond to feature vectors extracted from a speech signal. For example, the training apparatus 100 extracts features from the speech signal and generates the speech sequence 130. The feature vectors extracted from the speech signal correspond to the frames in the speech sequence 130. The speech signal may be received by any one or any combination of two or more of live and real-time from a user with a connected microphone, received from a remote location, or retrieved from a storage location, either in total, or frame by frame depending upon the amount stored and the speed of the transmission medium.

In an acoustic model of a BRDNN in which a whole sentence provided by voice is taken into consideration, acoustic scores are calculated based on substantially all frames including a current frame, a previous frame and a next frame. However, training of the acoustic model 110 based on the whole sentence is unsuitable for real-time speech recognition in which a recognition result needs to be output while a user's voice is input, because a recognition performance decreases due to non-matching between a training process and a recognition process. For example, when the acoustic model 110 is trained based on a whole sentence in the training process and when a portion of the sentence is provided to the acoustic model 110 in the recognition process, the acoustic model 110 fails to accurately recognize the portion of the sentence. Thus, in the following examples, the acoustic model 110 is trained based on the input data 120, to enhance a real-time speech recognition performance of the acoustic model 110.

The training apparatus 100 extracts target data corresponding to a window with a predetermined size from the speech sequence 130. A size of a window corresponds to a length of a speech input in a real-time speech recognition process. The training apparatus 100 constructs the input data 120 based on the target data. The training apparatus 100 trains the acoustic model 110 in units of windows so that the acoustic model 110 is trained in substantially the same environment as the recognition process, which is further described below.

When the acoustic model 110 is trained in a unit of a window, an amount of information used for the training is reduced in comparison to training of the acoustic model 110 in a unit of a sequence. The training apparatus 100 extracts padding data adjacent to the target data as well as the target data from the speech sequence 130, and constructs the input data 120 based on the target data and the padding data. In this example, the acoustic model 110 analyzes information substantially adjacent to the target data, for example, preceding and succeeding the target data, and accordingly a reduction in an amount of information provided to the acoustic model 110 is supplemented.

Because a size of the input data 120 is adjusted based on a size of a window, the input data 120 is referred to as a "window-level input data 120." Similarly, an output of the acoustic model 110 corresponding to the window-level input data 120 is referred to as a "window-level acoustic score." When window-level acoustic scores are merged into a single acoustic score to have a length corresponding to the speech sequence 130, the single acoustic score is referred to as a "sequence-level acoustic score," which is further described below. Also, an error calculated based on the sequence-level acoustic score is referred to as a "sequence-level error" and an error obtained by dividing the sequence-level error based on a size of a window is referred to as a "window-level error." For example, a window level is referred to as a "frame level."

The training apparatus 100 merges acoustic scores output in correspondence to the input data 120, and performs sequence-level training. For example, the training apparatus 100 inputs the window-level input data 120 to the acoustic model 110. The acoustic model 110 outputs window-level acoustic scores. The training apparatus 100 acquires a sequence-level acoustic score by merging the window-level acoustic scores output from the acoustic model 110. The training apparatus 100 compares the sequence-level acoustic score to a label of the speech sequence 130 and calculates a sequence-level error. The training apparatus 100 divides the sequence-level error into window-level errors and updates the acoustic model 110 based on the window-level errors.

The window-level errors used to update the acoustic model 110 are calculated in a sequence level, and accordingly the training apparatus 100 trains the acoustic model 110 to be suitable for real-time speech recognition while maintaining an advantage of the sequence-level training.

Hereinafter, examples of an RDNN and a BRDNN and an example of the training apparatus 100 are sequentially described below.

Figure 2:
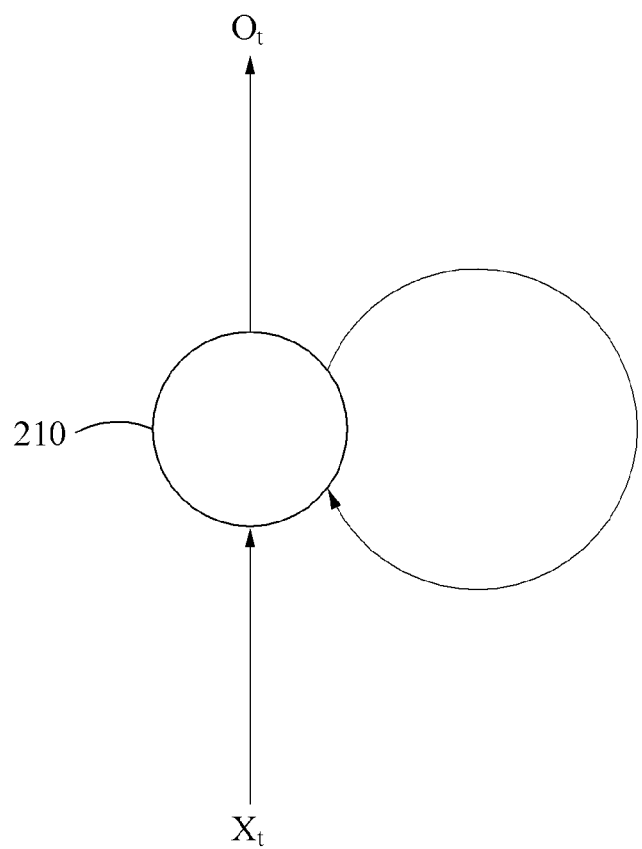
FIG. 2 is a diagram illustrating an example of a recurrent model.

FIG. 2 illustrates an example of a recurrent model 200. A deep neural network (DNN) is a recognition model implemented by software or hardware that is somewhat related to a calculation capability of a biological system using a large number of artificial neurons connected via synapses. As described above, an acoustic model is implemented by, for example, an RDNN or BRDNN that includes the recurrent model 200.

The recurrent model 200 has a feedback loop. When an output of the recurrent model 200 is input to the recurrent model 200 again, a new output $O_t$ is output from an input $X_t$. For example, the recurrent model 200 includes a node 210, and an output of the node 210 is input again to the node 210.

In the following description, a parameter indicating a value associated with the node 210 is a state parameter. For example, the state parameter includes an output value of the node 210. The state parameter is referred to as a "node parameter."

For example, the recurrent model 200 is a long short-term memory (LSTM) neural network. In the LSTM neural network, the node 210 includes a plurality of gates. In the LSTM neural network, the state parameter of the node 210 includes an output value of the node 210 and a cell state value of the node 210. The output value and the cell state value of the node 210 are controlled based on the gates of the node 210. However, the LSTM neural network is merely an example, and a structure of the recurrent model 200 is not limited to the LSTM neural network.

The input $X_t$ is frame data that is input to the recurrent model 200 at a time t, and the output $O_t$ is frame data that is output from the recurrent model 200 at the time t. The time t represents a timestamp t. Frame data is data obtained by sampling sequence data in a predetermined length (for example, a unit of a frame). A unit of a frame is set differently depending on embodiments. For example, sequence data corresponds to a speech sequence and frame data corresponds to each of frames included in the speech sequence.

Figure 3:
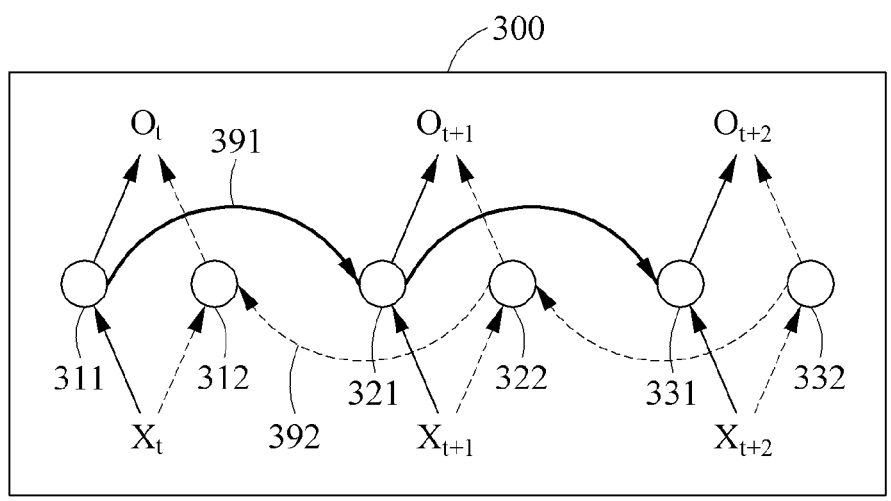
FIG. 3 is a diagram illustrating an example of a portion of nodes in a bidirectional recurrent deep neural network (BRDNN).

FIG. 3 illustrates an example of a portion of nodes in a BRDNN 300. Referring to FIG. 3, the BRDNN 300 is expressed in a structure in which a recurrent connection is unfolded to have the same length as a window length. For example, an unfolded length of the BRDNN 300 corresponds to a length of input data. An RDNN and BRDNN are different from each other in a backward node and a backward pass, and accordingly description other than the following description of the backward node and backward pass is also applicable to the RDNN.

The nodes of the BRDNN 300 are classified into forward nodes 311, 321 and 331, and backward nodes 312, 322 and 332. Each of the forward nodes 311, 321 and 331 corresponds to a single frame respectively, and each of the backward nodes 312, 322 and 332 also corresponds to a single frame respectively. Each frame corresponds to a single forward node and a single backward node. For example, a t-th frame corresponds to the forward node 311 and the backward node 312, and a (t+1)-th frame corresponds to the forward node 321 and the backward node 322. However, there is no limitation thereto, and a single frame may correspond to a plurality of forward nodes and a plurality of backward nodes.

Each of the forward nodes 311, 321 and 331 is connected to another forward node through a recurrent connection that forms a forward pass 391 (e.g. traversing from node 311 to node 321 and on to node 331). Each of the backward nodes 312, 322 and 332 is connected to another backward node through a recurrent connection that forms a backward pass 392 (e.g. traversing backwards from node 332 to node 322 and on to node 312). For example, the forward pass 391 is a connection to update a state parameter based on an equation and transmit the state parameter to a forward node corresponding to a next frame. Also, the backward pass 392 is a connection to update a state parameter based on an equation and transmit the state parameter to a backward node corresponding to a previous frame. An update path of a forward node and an update path of a backward node are independently separate from each other.

In FIG. 3, a length of a window corresponds to, for example, three frames. A training apparatus inputs frame data $X_t$ at a time t to the forward node 311 and the backward node 312 that correspond to the time t. The training apparatus propagates a state parameter at the time t from the forward node 311 of a frame corresponding to the time t to the forward node 321 of a frame corresponding to a time t+1 through the forward pass 391. Also, the training apparatus propagates a state parameter at the time t+1 from the backward node 322 of the frame corresponding to the time t+1 to the backward node 312 of the frame corresponding to the time t through the backward pass 392. The training apparatus calculates an output $O_t$ corresponding to a t-th frame from an input $X_t$ using a state parameter of a node (for example, the forward node 311 and the backward node 312) updated through the forward pass 391 and the backward pass 392.

In FIG. 3, the length of the window corresponds to the three frames and a portion of the nodes in the BRDNN 300 is shown for clarity, however, there is no limitation thereto and may be formed of any suitable number of nodes.

Figure 4:
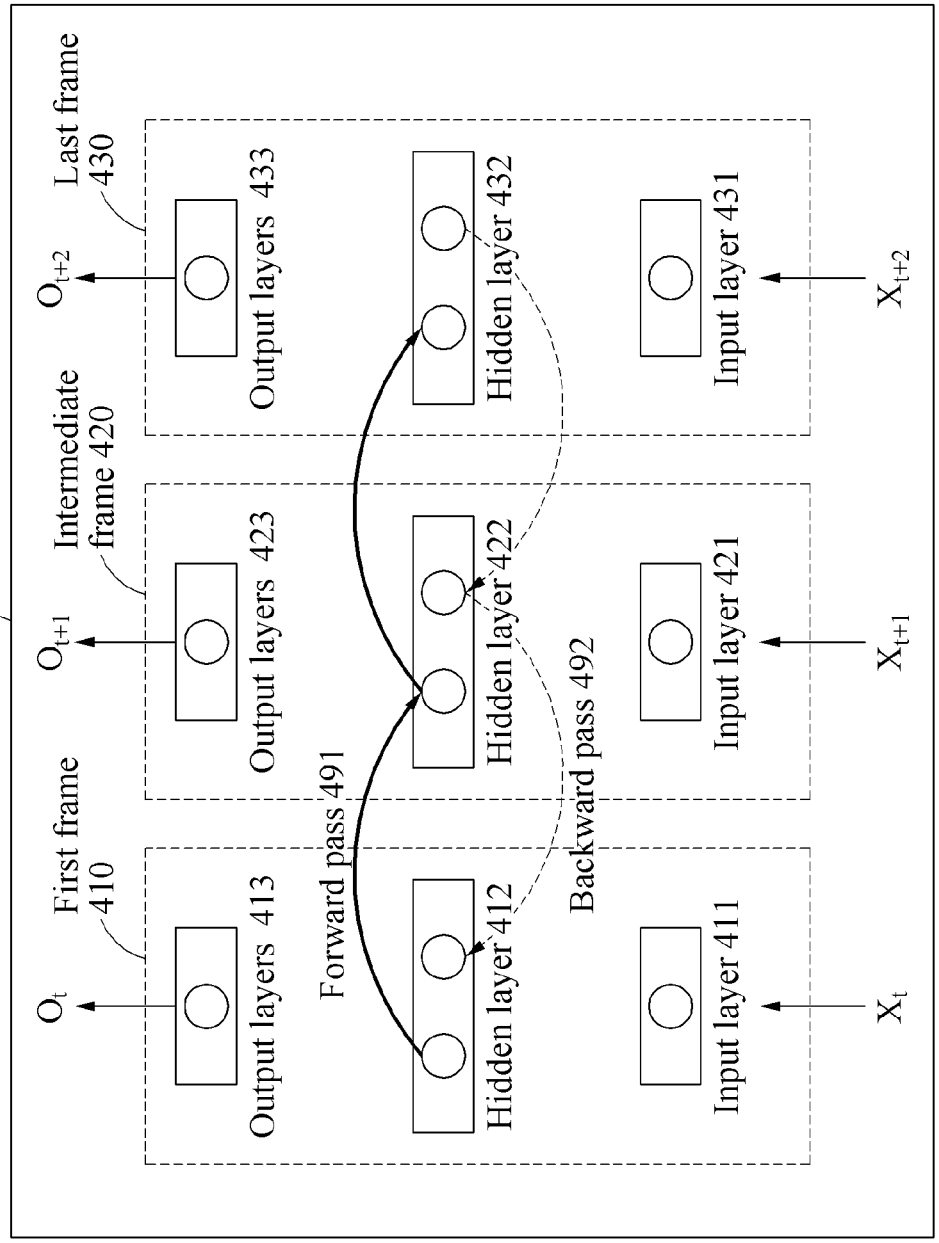
FIG. 4 is a diagram illustrating an example of a BRDNN.

FIG. 4 illustrates an example of a BRDNN 400. The BRDNN 400 includes an input layer, a hidden layer and an output layer. The hidden layer includes a plurality of nodes as hidden nodes. When the BRDNN 400 is an LSTM neural network, each of nodes in the BRDNN 400 includes a memory cell unit, and the memory cell unit includes at least one time gate.

The input layer receives input data for performing training or recognition and transfers the input data to the hidden layer. The output layer outputs acoustic scores based on signals received from the nodes of the hidden layer. The hidden layer is located between the input layer and the output layer, and changes data to be recognized or training data transferred through the input layer to a value that is relatively more easily predictable.

Nodes included in the input layer and nodes included in the hidden layer are connected to each other through synapses with connection weights. Also, nodes included in the hidden layer and nodes included in the output layer are connected to each other through synapses with connection weights. Each of the input layer, the hidden layer and the output layer includes a plurality of nodes.

In FIG. 4, each of an input layer and an output layer includes a single node and a hidden layer includes two nodes, however, this is merely an example for convenience of description. Accordingly, nodes included in each layer and a number of the nodes vary depending on a design.

A neural network includes a plurality of hidden layers. The neural network including the plurality of hidden layers is referred to as a "DNN," and training of the DNN is referred to as "deep learning." A node included in a hidden layer is referred to as a "hidden node." A state parameter (for example, an output value) of a hidden node in a previous time interval is connected to hidden nodes in a current time interval (for example, a current frame). Also, a state parameter of a hidden node in the current time interval is connected to hidden nodes in a next time interval.

As described above, a neural network with recurrent connections between hidden nodes in different time intervals is referred to as a "recurrent neural network." The recurrent neural network including a plurality of hidden layers is referred to as an "RDNN." Also, when the RDNN has a bidirectional recurrent connection, the RDNN is referred to as a "BRDNN." In the BRDNN 400, a recurrent connection between forward nodes, and a recurrent connection between backward nodes are generated.

FIG. 4 illustrates an unfolded BRDNN 400 when a length of a window corresponds to three frames. In FIG. 4, the BRDNN 400 includes input layers 411, 421 and 431, hidden layers 412, 422 and 432 and output layers 413, 423 and 433, for a first frame 410, an intermediate frame 420 and a last frame 430 of input data, there is no limitation to the above example. For example, the BRDNN 400 includes a plurality of hidden layers for each frame of input data.

Each of the layers in the BRDNN 400 receives a timestamp t corresponding to a current time, for example, a time that does not have inter-layer delays. The timestamp t corresponds to a phase signal. The phase signal is applied to all layers updated at the same time.

For example, the input layer 411, the hidden layer 412 and the output layer 413 are updated at a time t in the first frame 410. The input layer 421, the hidden layer 422 and the output layer 423 are updated at a time t+1 in the intermediate frame 420. The input layer 431, the hidden layer 432 and the output layer 433 are updated at a time t+2 in the last frame 430.

Data input to the BRDNN 400 is sampled from a continuous speech signal. The data input to the BRDNN 400 is substantially uniformly and synchronously sampled, or non-uniformly and asynchronously sampled according to one or more embodiments.

A hidden layer corresponding to each of frames in the BRDNN 400 forms a forward pass 491 with a hidden layer with the same level corresponding to a next frame. For example, in a recurrent neural network, an i-th forward node of the hidden layer 412 corresponding to a first frame in a window forms the forward pass 491 with an i-th forward node of the hidden layer 422 corresponding to a next frame. In this example, i is an integer greater than or equal to "1."

Also, a hidden layer corresponding to each of the frames in the BRDNN 400 forms a backward pass 492 with a hidden layer with the same level corresponding to a previous frame. For example, a j-th backward node of the hidden layer 422 corresponding to an intermediate frame in the BRDNN 400 forms the backward pass 492 with a j-th backward node of the hidden layer 412 corresponding to a previous frame. In this example, j is an integer greater than or equal to "1." Also, nodes are classified into forward nodes connected through the forward pass 491 and backward nodes connected through the backward pass 492.

Figure 5:
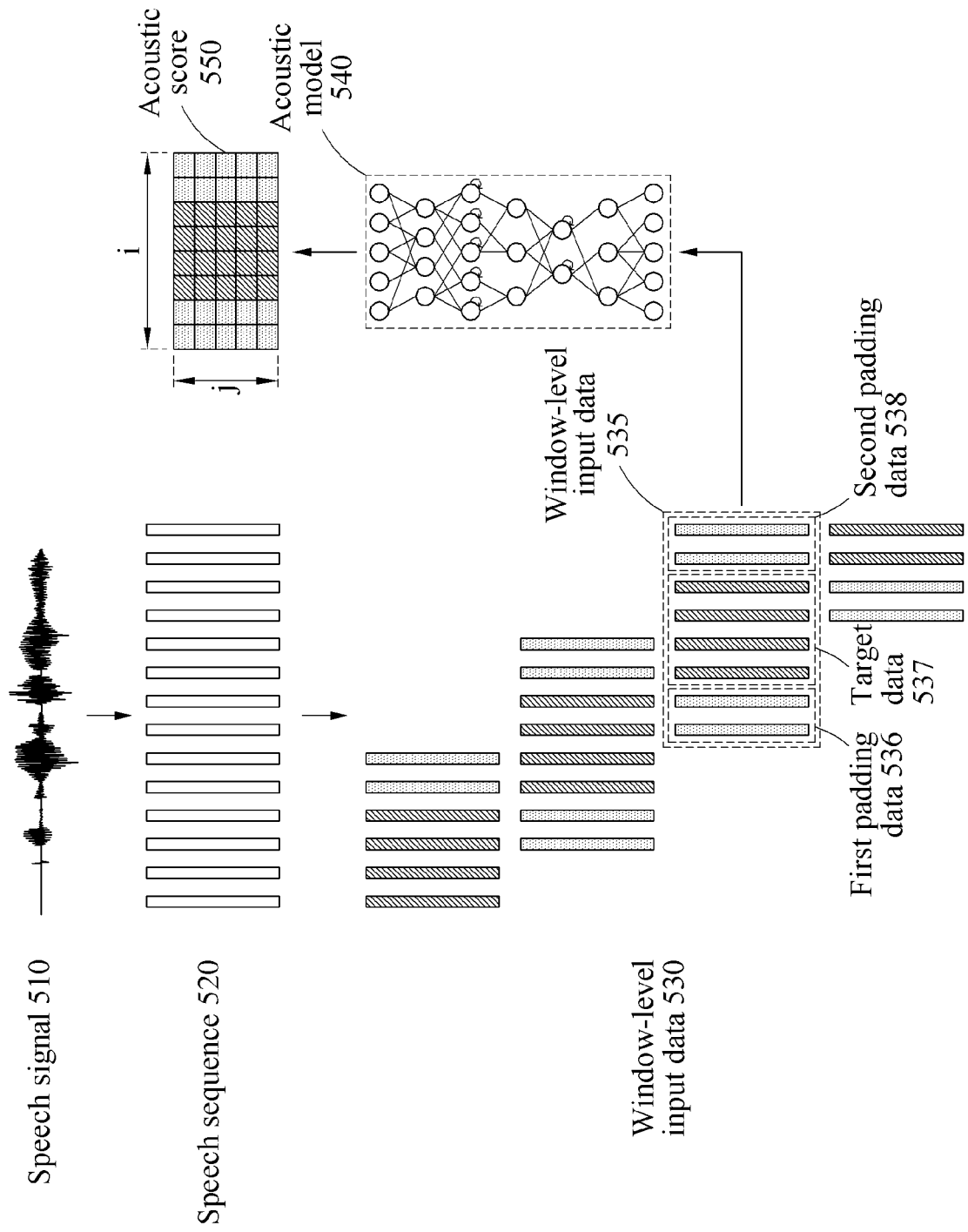
FIG. 5 is a diagram illustrating an example of a process of constructing input data and a process of outputting an acoustic score.

FIG. 5 illustrates an example of a process of constructing input data and a process of outputting an acoustic score. Referring to FIG. 5, a training apparatus converts a speech signal 510 to a speech sequence 520, and constructs window-level input data 530 based on the speech sequence 520.

The speech sequence 520 includes "N" frames. The speech sequence 520 is divided into consecutive windows that each include "W" frames and that do not overlap (with the possible exception of padding data). For example, a first window includes a first frame through a W-th frame. Also, a second window includes a (W+1)-th frame through a 2W-th frame. Accordingly, an i-th window includes an ((i−1)*W+1)-th frame through an ((i−1)*W+W)-th frame. For example, W is "4" as shown in FIG. 5.

The acoustic model 540 calculates an acoustic score of a predetermined frame based on frames adjacent to the frame. For example, an acoustic score of a frame near to an end of a window may be incorrectly calculated due to an insufficient frame on a left or right side of the frame. In this example, an accuracy of the acoustic score of the frame is enhanced using a padding frame.

The training apparatus constructs the window-level input data 530 with target data and padding data. The target data refers to payload frames included in a window, and padding data refers to frames added to the target data. The padding data includes first padding data preceding the target data in the speech sequence 520, second padding data following the target data in the speech sequence 520, or a combination thereof. For example, window-level input data 535 includes first padding data 536, target data 537 and second padding data 538. For convenience of description, the first padding data and second padding data are referred to as left padding data and right padding data, respectively.

For example, a number of frames included in the left padding data is defined as LP, and a number of frames included in the right padding data is defined as RP. In this example, the window-level input data 530 has a size of "LP+W+RP." An LP in first input data has a value of zero, and an RP in last input data has a value of zero to "W." The LP and the RP are adjusted for each input data, as necessary considering the amount of target data and available padding data preceding and/or succeeding the target data. For example, to quickly provide a recognition result to a user, the LP in the first input data is lesser, being adaptively adjusted in comparison to an LP in the other input data.

The training apparatus inputs the window-level input data 530 to the acoustic model 540. The acoustic model 540 outputs acoustic scores in response to an input of the window-level input data 530. For example, the acoustic model 540 outputs an acoustic score 550 in response to the input of the window-level input data 535. Frames included in the window-level input data 530 are sequentially input to the acoustic model 540 in an order of time, and the acoustic model 540 outputs acoustic scores corresponding to the input frames. For example, in the acoustic score 550, a column i corresponds to a number of frames included in the window-level input data 535, and a row j indicates scores for each pronunciation. The row j of the acoustic score 550 indicates a score corresponding to a pronunciation "a," a score corresponding to a pronunciation "e," a score corresponding to a pronunciation "i," a score corresponding to a pronunciation "o," and a score corresponding to a pronunciation "u."

Pronunciations included in the acoustic score 550 are determined based on various predefined criteria. For example, pronunciations are determined based on phonemes or triphones. Triphones are determined based on a factor that has an influence on a pronunciation of a reference phoneme before the reference phoneme, and a factor that has an influence on the pronunciation of the reference phoneme after the reference phoneme. For example, when e.g. 48 pronunciations are provided, $(48 \times 3)^3$ triphones are present.

In the acoustic model 540, a number of input nodes corresponds to a number of elements of a vector representing a frame, and a number of output nodes corresponds to a number of pronunciations included in the acoustic score 550. When a relatively large number of pronunciations is included in the acoustic score 550, processing of the acoustic model 540 is delayed. Accordingly, the number of pronunciations is properly adjusted. For example, when pronunciations are determined based on triphones, representative pronunciations are extracted from pronunciations belonging to the triphones. For example, about 6,000 representative pronunciations are determined. In this example, the acoustic score 550 has 6,000 rows.

Figure 6:
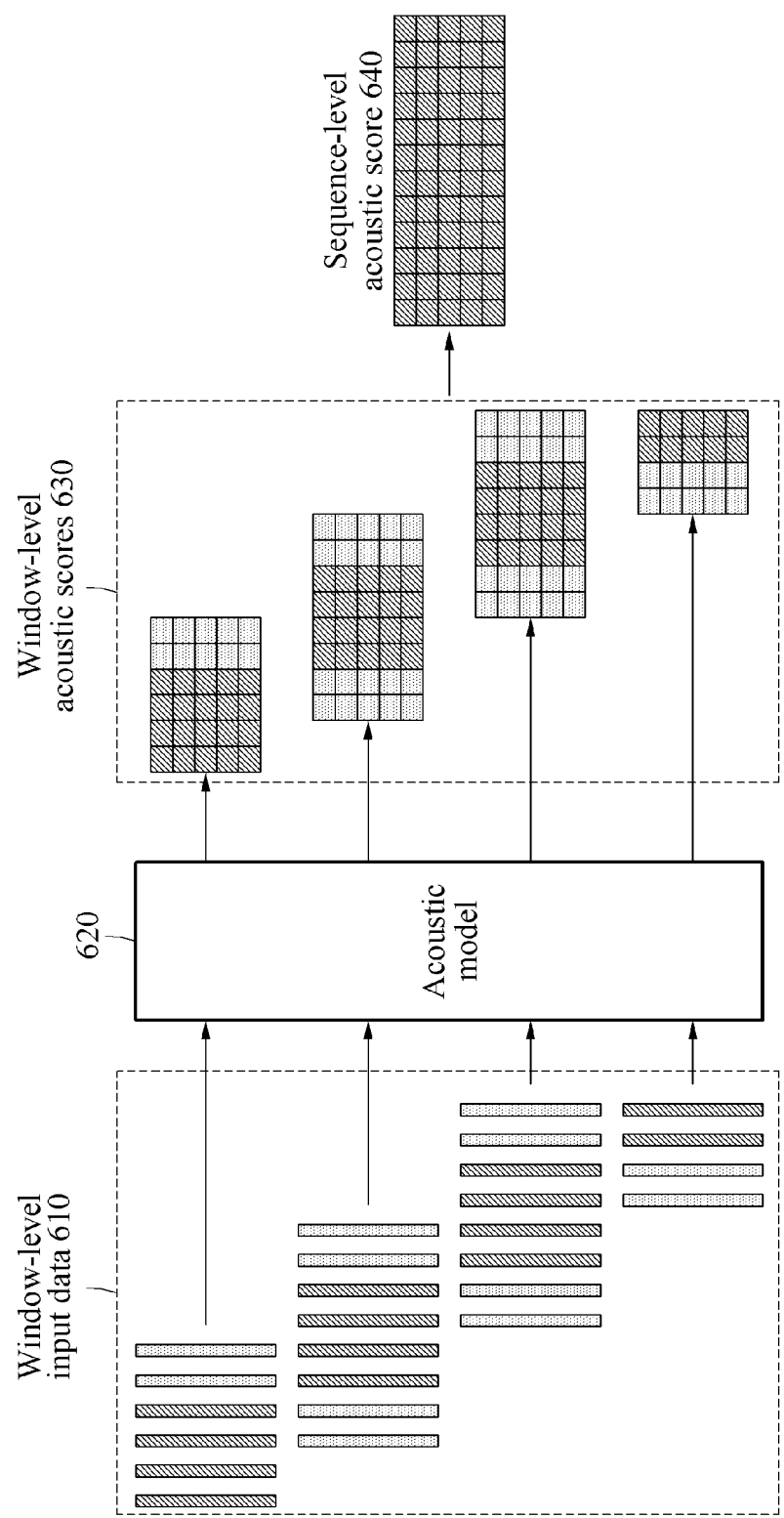
FIG. 6 is a diagram illustrating an example of a sequence-level acoustic score.

FIG. 6 illustrates an example of a sequence-level acoustic score 640. Referring to FIG. 6, a training apparatus inputs window-level input data 610 to an acoustic model 620, and acquires window-level acoustic scores 630 based on an output of the acoustic model 620. The acoustic model 620 sequentially outputs the window-level acoustic scores 630 based on the window-level input data 610. For example, when an acoustic sequence (*a speech sequence includes "N" frames and when a window includes "W" frames, acoustic scores of "N/W" pieces of input data are output). Also, as described above, each window further includes frames corresponding to padding data. The acoustic model 620 also outputs acoustic scores of the frames corresponding to the padding data according to one or more embodiments; however, in other embodiments, the acoustic scores of the padding data are excluded and used only for context in calculating the payload target data contained between the padding data.

The training apparatus acquires acoustic scores corresponding to target data by removing acoustic scores corresponding to padding data from the window-level acoustic scores 630, connects the acoustic scores corresponding to the target data, and acquires the sequence-level acoustic score 640. The padding data is added to increase an accuracy of an acoustic score of a frame that is near to a start or end of a window in a process of calculating acoustic scores, and accordingly is removed in a process of acquiring the sequence-level acoustic score 640. The training apparatus calculates a sequence-level error based on the sequence-level acoustic score 640.

Figure 7:
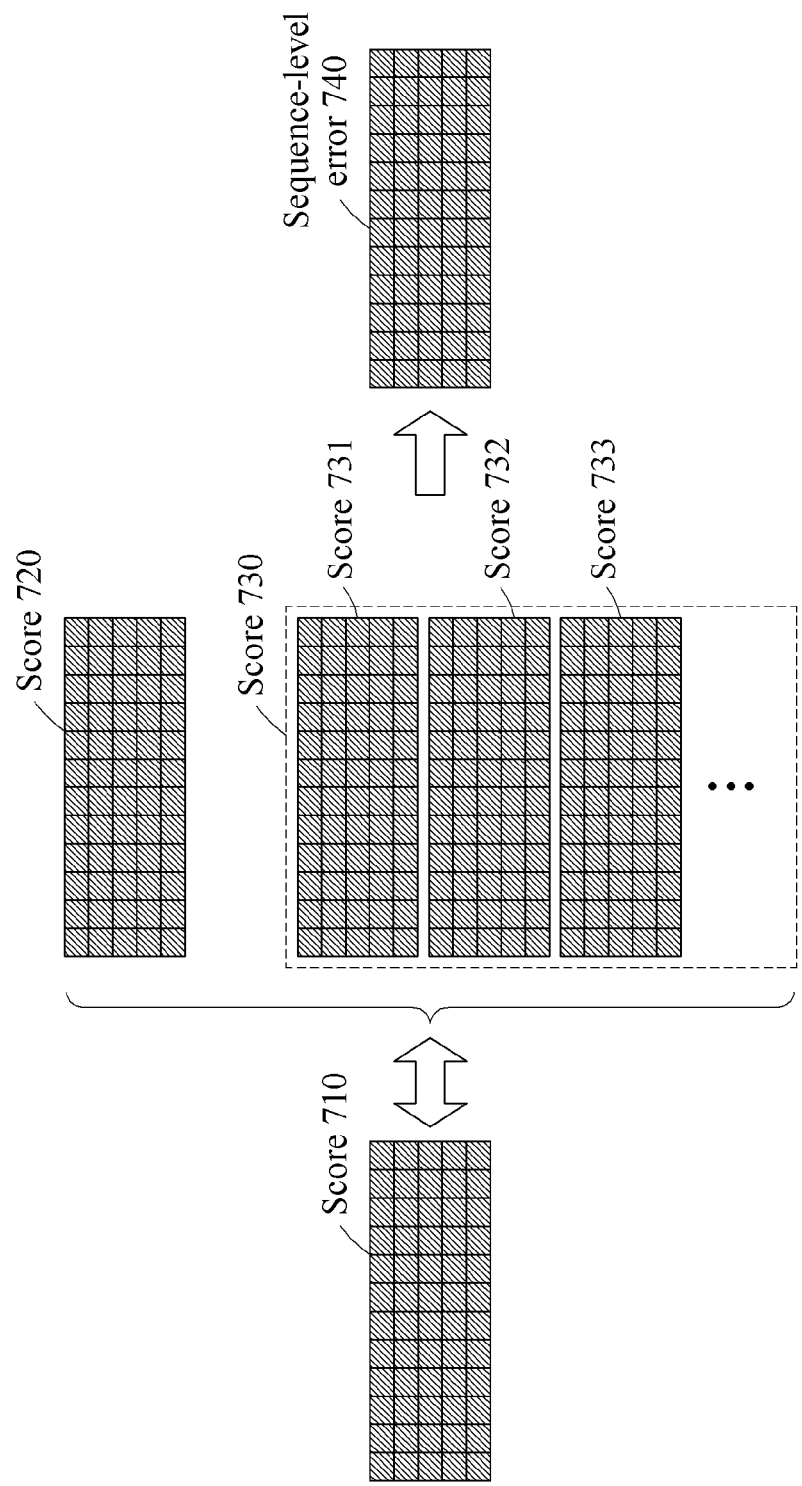
FIG. 7 is a diagram illustrating an example of a process of calculating a sequence-level error.

FIG. 7 illustrates an example of a process of calculating a sequence-level error 740. Referring to FIG. 7, a training apparatus calculates the sequence-level error 740 based on a sequence-level acoustic score and a reference sentence associated with a speech sequence. The training apparatus acquires a score 710 corresponding to the sequence-level acoustic score, and scores 720 and 730 corresponding to pronunciation probabilities of the reference sentence, using a language model and a decoder. The training apparatus compares the score 710 to the score 720 or 730 and calculates the sequence-level error 740. The language model provides information about how often a predetermined word or predetermined sentence is used. The decoder calculates which word or sentence is similar to an input speech based on information provided by an acoustic model and the information provided by the language model. The scores 710, 720 and 730 represent a recognition probability of a predetermined speech sequence based on the decoder and the language model.

The reference sentence includes at least one of a correct sentence associated with the speech sequence or an incorrect sentence associated with the speech sequence. For example, in FIG. 7, the score 720 corresponds to a pronunciation probability associated with a correct sentence, and the score 730 corresponds to a pronunciation probability associated with an incorrect sentence. The score 730 includes a score 731 corresponding to a pronunciation probability associated with a first incorrect sentence, a score 732 corresponding to a pronunciation probability associated with a second incorrect sentence, and a score 733 corresponding to a pronunciation probability associated with a third incorrect sentence. The training apparatus acquires the scores 720 and 730 using a language model and a decoder.

A number of incorrect sentences is determined in advance. Incorrect sentences are selected based on a predetermined criterion. For example, sentences similar to a correct sentence are selected as incorrect sentences. The training apparatus extracts sentences with relatively high scores using a decoder from sentences other than a correct sentence, and selects an incorrect sentence from the extracted sentences. The training apparatus determines a predetermined number of incorrect sentences in a descending order of scores from the extracted sentences.

The score 710 is compared to the score 720 or 730 for each element. For example, elements included in [m n] of the score 710 are compared to elements included in [m n] of the score 720. In this example, [m n] represents m rows and n columns. The training apparatus calculates the sequence-level error 740 by comparing the scores 710 and 720 for each element. The training apparatus determines that the sequence-level error 740 increases when a difference between the scores 710 and 720 increases. Also, the training apparatus determines that the sequence-level error 740 increases when a difference between the scores 710 and 730 decreases.

Figure 8:
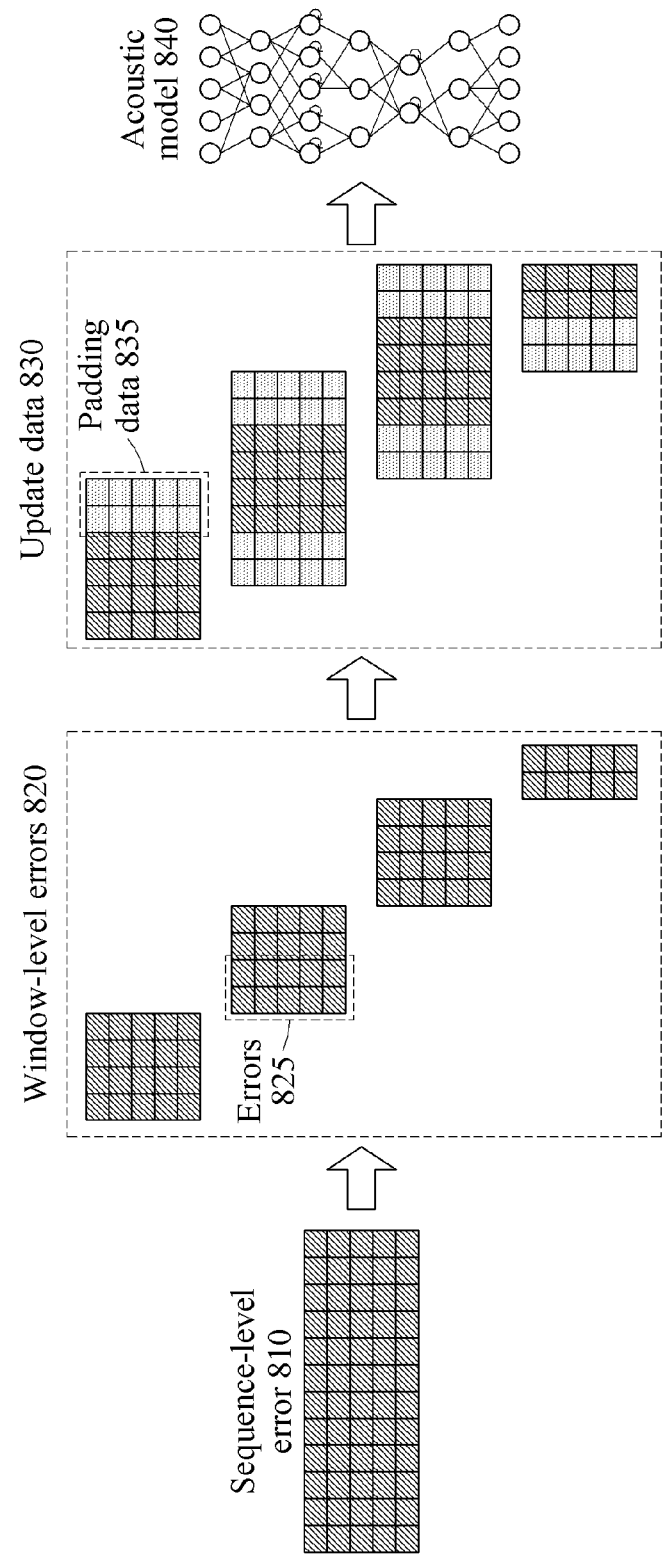
FIG. 8 is a diagram illustrating an example of a process of updating an acoustic model.

FIG. 8 illustrates an example of a process of updating an acoustic model 840. Referring to FIG. 8, a training apparatus acquires window-level errors 820 by dividing a sequence-level error 810, and updates the acoustic model 840 based on the window-level errors 820. The training apparatus updates the acoustic model 840 so that the window-level errors 820 are reduced.

For example, when the sequence-level error 810 corresponds to a speech sequence including "N" frames, the sequence-level error 810 is divided into consecutive windows that each include "W" frames and that do not overlap, so that the window-level errors 820 are acquired. In this example, a first window includes errors for a first frame through a W-th frame, and a second window includes errors for a (W+1)-th frame through a 2W-th frame. Thus, an i-th window includes errors for an ((i−1)*W+1)-th frame through an ((i−1)*W+W)-th frame.

The acoustic model 840 is unfolded based on input data that is input in a process of calculating acoustic scores, and accordingly should be updated to data suitable for a size of the input data. Thus, the training apparatus constructs update data 830 based on the window-level errors 820 and (in some embodiments) padding data, and updates the acoustic model 840 based on the update data 830. The padding data includes zero, or an error of a window adjacent to a window corresponding to the window-level errors 820. For example, padding data 835 is filled with zeros or errors 825 of a neighboring window. A size of padding data included in the update data 830 corresponds to a size of padding data included in the above-described input data.

The acoustic model 840 is sequentially updated based on the update data 830. In the above example, the acoustic model 840 is updated "N/W" times in total.

The training apparatus trains the acoustic model 840 using error backpropagation learning. For example, the training apparatus updates a connection weight of the acoustic model 840 or a state parameter of a node. The training apparatus trains the acoustic model 840 through e.g. supervised learning. The supervised learning is a scheme of inputting a training input and a training output corresponding to the training input to the acoustic model 840 and adjusting a parameter of the acoustic model 840 so that the training output is output.

The error backpropagation learning is a scheme of estimating an error by a forward computation of given training data, propagating the estimated error backwards from an output layer to a hidden layer and an input layer, and adjusting connection weights to reduce an error. Processing for recognition of the acoustic model 840 is performed in an order of the input layer, the hidden layer and the output layer, however, parameters in the error backpropagation learning are updated in an order of the output layer, the hidden layer and the input layer.

The acoustic model 840 is trained based on window-level input data to match a real-time speech recognition process, and exhibits a high performance in the real-time speech recognition. Also, the acoustic model 840 is trained based on the sequence-level error 810, and accordingly has a robust performance against a word or sentence.

Figure 9:
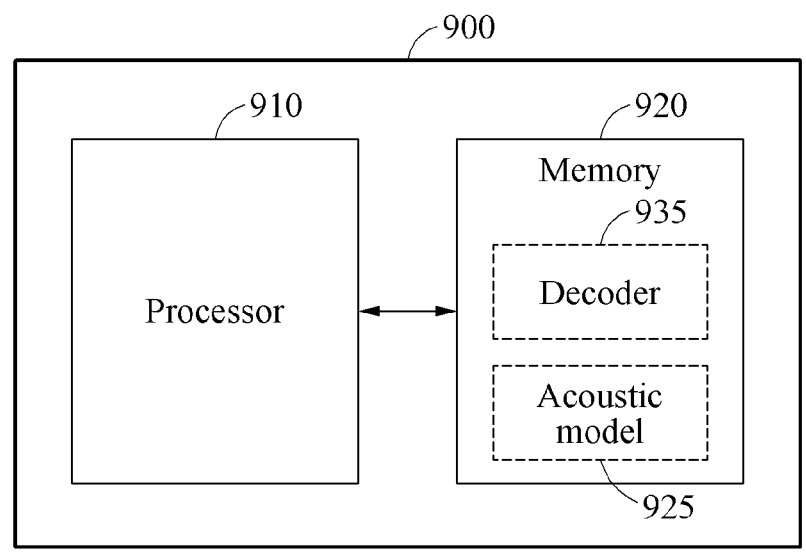
FIG. 9 is a block diagram illustrating an example of a recognition apparatus.

FIG. 9 illustrates an example of a recognition apparatus 900. Referring to FIG. 9, the recognition apparatus 900 includes a processor 910 and a memory 920. The memory 920 includes an acoustic model 925. The processor 910 acquires the acoustic model 925 from the memory 920. The acoustic model 925 is trained in advance through the above-described training process. The processor 910 receives, as an input, a speech signal and generates a speech sequence by sampling the speech signal. The processor 910 divides the speech sequence in a window level and provides the divided speech sequence to the acoustic model 925. The memory 920 further includes a decoder 935. The decoder outputs a recognition result based on an output of the acoustic model 925.

Figure 10:
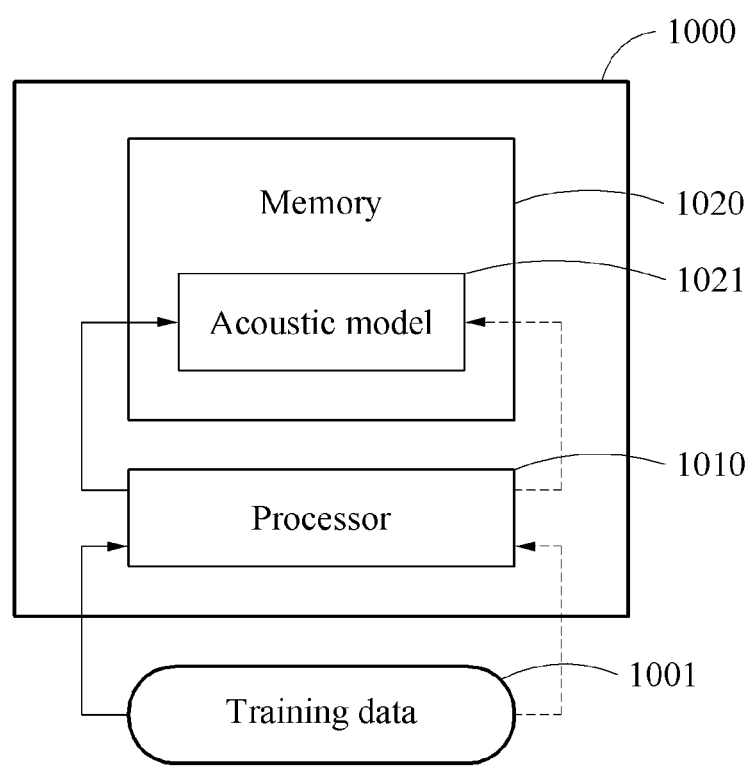
FIG. 10 is a block diagram illustrating an example of a training apparatus.

FIG. 10 illustrates an example of a training apparatus 1000. Referring to FIG. 10, the training apparatus 1000 includes a processor 1010 and a memory 1020. The memory 1020 includes an acoustic model 1021. The processor 1010 acquires the acoustic model 1021 from the memory 1020. The memory 1020 stores instructions readable by a computer. When the instruction stored in the memory 1020 is executed by the processor 1010, the processor 1010 constructs window-level input data based on a speech sequence, inputs the window-level input data to the acoustic model 1021, calculates a sequence-level error based on an output of the acoustic model 1021, acquires window-level errors by dividing the sequence-level error, and updates the acoustic model 1021 based on the window-level errors. The memory 1020 stores training data 1001 and the acoustic model 1021 that is sequentially updated during a training process. The above description is also applicable to the training apparatus 1000, and accordingly is not repeated here for brevity and clarity.

Figure 11:
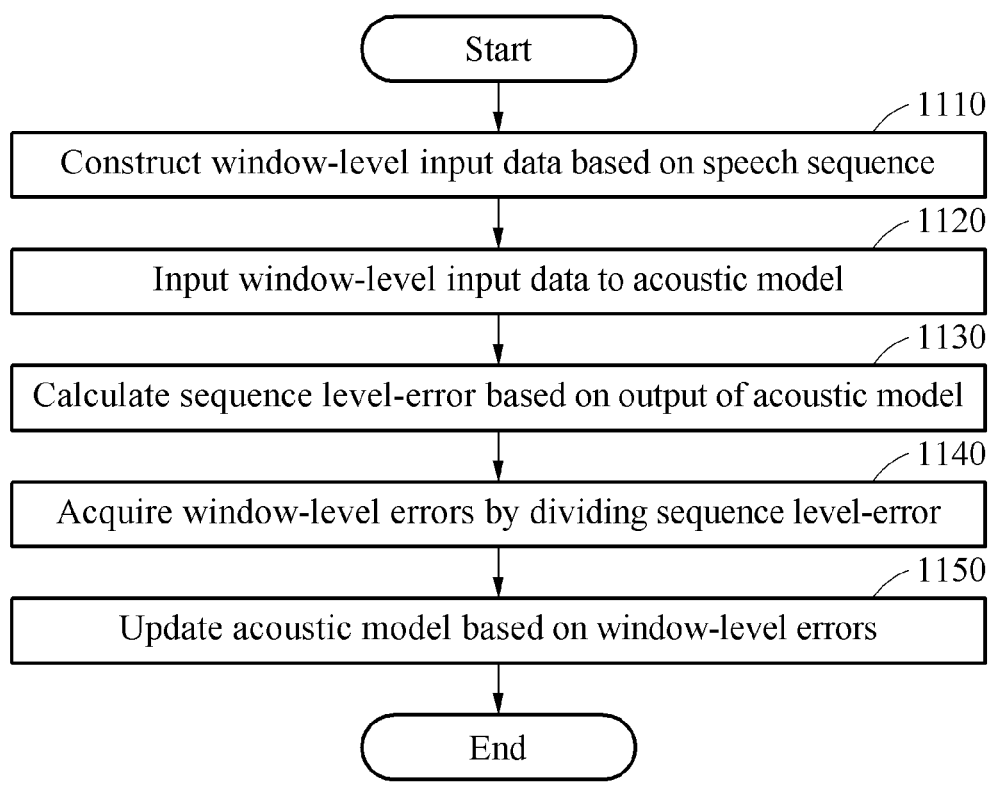
FIG. 11 is a flowchart illustrating an example of a training method.

FIG. 11 illustrates an example of a training method. Referring to FIG. 11, in operation 1110, a training apparatus constructs window-level input data based on a speech sequence. In operation 1120, the training apparatus inputs the window-level input data to an acoustic model. In operation 1130, the training apparatus calculates a sequence-level error based on an output of the acoustic model. In operation 1140, the training apparatus acquires window-level errors by dividing the sequence-level error. In operation 1150, the training apparatus updates the acoustic model based on the window-level errors. The acoustic model may be employed to recognize user speech including commands or text payload on a device such as a phone, smartwatch, or other user device. The above description is also applicable to the training method, and accordingly is not repeated here.

The apparatus for training the acoustic model and components thereof in FIGS. 1-11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, oscillators, signal generators, inductors, capacitors, buffers, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by either one or both of analog electrical components, mixed mode components, and computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions, firmware, design model, or software include machine code that is directly executed by the one or more processors or computers, such as machine code produced by a compiler. In another example, the instructions, firmware, analog logic, or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions, firmware, or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Although specific terminology has been used in this disclosure, it will be apparent after an understanding of the disclosure of this application that different terminology may be used to describe the same features, and such different terminology may appear in other applications.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A training method of an acoustic model, comprising:
    constructing window-level input speech data based on a speech sequence;
    sequentially inputting frames included in the window-level input speech data to an acoustic model in an order of time, wherein the acoustic model comprises a recurrent deep neural network (RDNN) and calculates window-level acoustic scores corresponding to the input frames of the window-level input speech data based on frames adjacent to each respective input frame;
    acquiring a sequence-level acoustic score by connecting the window-level acoustic scores calculated by the acoustic model, wherein the sequence-level acoustic score is associated with more frames than one of the window-level acoustic scores;
    calculating a sequence level-error by comparing the sequence-level acoustic score and scores corresponding to pronunciation probabilities of a reference sentence associated with the speech sequence;
    dividing the sequence level-error into consecutive windows to acquire window-level errors; and
    updating the acoustic model based on the window-level errors.

2. The method of claim 1, wherein the constructing of the window-level input data comprises:
    extracting target data corresponding to a window with a predetermined size and padding data adjacent to the target data from the speech sequence; and
    constructing the window-level input data based on the target data and the padding data.

3. The method of claim 2, wherein the padding data comprises at least one of first padding data preceding the target data in the speech sequence or second padding data following the target data in the speech sequence.

4. The method of claim 1, further comprising:
    acquiring acoustic scores corresponding to target data by removing acoustic scores corresponding to padding data from the window-level acoustic scores; and
    connecting the acoustic scores corresponding to the target data.

5. The method of claim 1, wherein the reference sentence comprises at least one of a correct sentence associated with the speech sequence or an incorrect sentence associated with the speech sequence.

6. The method of claim 1, wherein the acoustic model is updated so that the window-level errors are reduced.

7. The method of claim 1, wherein the updating of the acoustic model comprises:
    constructing update data based on the window-level errors and padding data; and
    updating the acoustic model based on the update data.

8. The method of claim 7, wherein the padding data comprises either one or both of zeroed data and an error of a window adjacent to a window corresponding to the window-level errors.

9. The method of claim 7, wherein a size of the padding data corresponds to a size of padding data included in the window-level input data.

10. The method of claim 1, wherein
    an unfolded length of the RDNN corresponds to a length of the window-level input data.

11. The method of claim 1, further comprising, actuating the updated acoustic model to recognize a user's speech.

12. The method of claim 1, further comprising:
acquiring a first score corresponding to the sequence-level acoustic score, acquiring a second score corresponding to a pronunciation probability of the reference sentence, and acquiring a third score corresponding to a pronunciation probability of the reference sentence; and
calculating the sequence-level error by comparing the first score to the second score and/or by comparing the first score to the third score.

13. The method of claim 12, further comprising:
determining that the sequence-level error increases when a difference between the first score and the second score increases and/or determining that the sequence-level error increases when a difference between the first score and the third score decreases.

14. The method of claim 1, wherein the speech sequence includes N frames, each window of the consecutive windows includes W frames, and the updating of the acoustic model is performed N/W times.

15. A non-transitory computer-readable storage medium storing instructions that, when actuated by a processor, cause the processor to perform the method of claim 1.

16. An acoustic model training apparatus, comprising:
at least one processor; and
a memory comprising an instruction that is readable by the processor,
wherein in response to the instruction being executed by the processor, the processor is configured to
construct window-level input speech data based on a speech sequence,
sequentially input frames included in the window-level input speech data to an acoustic model, wherein the acoustic model comprises a recurrent deep neural network (RDNN) and calculates window-level acoustic scores corresponding to the input frames of the window-level input speech data based on frames adjacent to each respective input frame,
acquire a sequence-level acoustic score by connecting the window-level acoustic scores calculated by the acoustic model, wherein the sequence-level acoustic score is associated with more frames than one of the window-level acoustic scores,
calculate a sequence level-error by comparing the sequence-level acoustic score and scores corresponding to pronunciation probabilities of a reference sentence associated with the speech sequence, divide the sequence level-error into consecutive windows to acquire window-level errors, and update the acoustic model based on the window-level errors.

17. The apparatus of claim 16, wherein the processor is further configured to extract target data corresponding to a window with a predetermined size and padding data adjacent to the target data from the speech sequence, and to construct the window-level input data based on the target data and the padding data.

18. The apparatus of claim 17, wherein the padding data comprises at least one of first padding data preceding the target data in the speech sequence or second padding data following the target data in the speech sequence.

19. The apparatus of claim 16, wherein the processor is further configured to acquire acoustic scores corresponding to target data by removing acoustic scores corresponding to padding data from the window-level acoustic scores, and to acquire the sequence-level acoustic score by connecting the acoustic scores corresponding to the target data.

20. The apparatus of claim 16, wherein the reference sentence comprises at least one of a correct sentence associated with the speech sequence or an incorrect sentence associated with the speech sequence.

21. The apparatus of claim 16, wherein the acoustic model is updated so that the window-level errors are reduced.

22. The apparatus of claim 16, wherein the processor is further configured to construct update data based on the window-level errors and padding data, and to update the acoustic model based on the update data.

23. The apparatus of claim 22, wherein the padding data comprises either one or both of zeroed data and an error of a window adjacent to a window corresponding to the window-level errors.

24. The apparatus of claim 22, wherein a size of the padding data corresponds to a size of padding data included in the window-level input data.

25. The apparatus of claim 16, wherein
an unfolded length of the RDNN corresponds to a length of the window-level input data.

* * * * *